April 12, 1938.  R. W. ROSS ET AL  2,113,748
EXHIBITING INSTRUMENT
Filed April 18, 1936  4 Sheets-Sheet 3

INVENTORS
Raymond W. Ross and
Sigurd H. Soderhagen, deceased
By Sophie Soderhagen, Executrix
BY Cornelius D. Ehret
ATTORNEY.

Patented Apr. 12, 1938

2,113,748

UNITED STATES PATENT OFFICE 2,113,748

EXHIBITING INSTRUMENT

Raymond W. Ross, Philadelphia, and Sigurd H. Seberhagen, deceased, late of Philadelphia, by Sophie Seberhagen, executrix, Philadelphia, Pa., assignors to Leeds and Northrup Company, Philadelphia, Pa., a corporation of Pennsylvania Application April 18, 1936, Serial No. 75,209

8 Claims. (Cl. 234—5.5)

This invention relates to exhibiting instruments including apparatus for indicating and/or recording, or otherwise measuring the magnitude of electrical, physical, chemical or other conditions or controlling them in response to changes thereof, and more particularly to such apparatus made up of a plurality of readily interchangeable and complemental unit asemblies by means of which the apparatus may be adapted to various types of service.

This application is a continuation-in-part of our copending application Serial No. 3,274, filed January 24, 1935, for Recording apparatus.

More specifically, this invention comprises indicating, recording, and/or controlling apparatus having a main chassis or frame upon which are mounted or supported to form a single unit the essential parts of the recorder, or those parts or mechanisms which are common to all types of instruments; these include the primary condition responsive element, such as a galvanometer, a power device, and a mechanical relay apparatus driven by the power device for reproducing deflections of the primary condition responsive element with amplified displacement and/or torque.

To the main chassis is detachably and individually secured one of a plurality of interchangeable recording element units or assemblies effective to convert the recorder into any of a number of desired types, for example, a simple curve drawing instrument, a dot-and-dash instrument, or a multiple-record printing instrument; also there is detachably secured thereto one of a plurality of interchangeable unit operating mechanisms or assemblies for the several recording element assemblies; further, an automatic recalibrating assembly which may be applied as a unit, or omitted, in accordance with the requirements of a particular installation; and, further, a unit record chart assembly interchangeable with other similar as well as different units for adapting the instrument to different scales or ranges of operation and for operation with strip charts or round charts.

While this invention is of general application and may include any of the well-known recording mechanisms, exhibiting apparatus, or operating mechanisms therefor, it is particularly suitable for application to a recorder embodying the several improved recording and operating mechanisms described and claimed in the copending applications, Serial Nos. 714,546, filed March 8, 1934, 75,208, filed April 18, 1936, and 3,194, 3,195 and 3,196, filed January 23, 1935, each application being assigned to the same assignee as the present invention.

For a better understanding of this invention, together with other and further features thereof, reference is had to the following description taken in connection with the accompanying drawings, and its scope will be pointed out in the appended claims.

In the drawings.

Fig. 1b is a perspective view of a unit operating mechanism arranged for complemental mounting on the main chassis and provided with means forming a driving connection for the recording element assembly of Fig. 1B;

Fig. 1c is a perspective view of a unit operating mechanism arranged for complemental mounting on the main chassis and provided with means forming a driving connection for the recording element assembly of Fig. 1C;

Fig. 6c is a perspective view of a front door for either of the housings to be used with the strip chart of Fig. 6C;

Fig. 6d is a perspective view of a front door for the housings of Fig. 6A or Fig. 6B to be used when the round-chart drive of Fig. 6D is used instead of the strip-chart drive of Fig. 6C.

Figures 1, 1A, 1B, 1C, 1D, 1E, 1F, 1G, 1H, 1K:
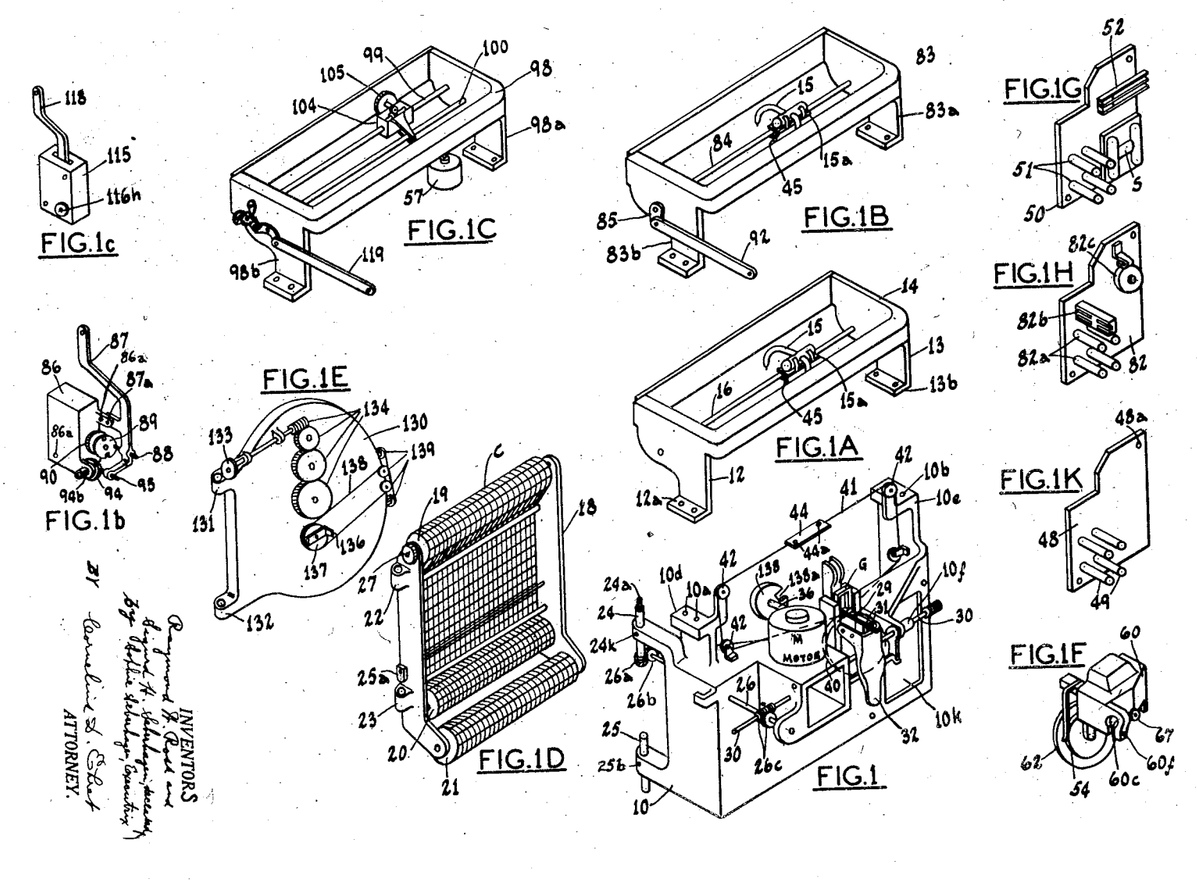
Fig. 1 is a perspective view of the main frame or chassis forming a part of the improved recording apparatus and upon which are permanently mounted the essential mechanisms of the recorder common to all its variations or types.
Figs. 1A, 1B, 1C are perspective views of subsidiary or complementary frames including necessary structure to form, respectively, in conjunction with the main chassis of Fig. 1, recording element assemblies for a curve drawing instrument, a dot-and-dash instrument, and a multiple-record printing instrument.
Figs. 1D and 1E are perspective views of additional subsidiary frames complemental to the main chassis of Fig. 1 and including, respectively, record chart supporting and driving means for a strip chart, and for a round chart.
Fig. 1F is a perspective view of an automatic current adjuster or recalibrating unit arranged to be mounted on the main chassis to form a complementary unit thereto.
Figs. 1G, 1H and 1K are respectively perspective views of panels supporting component parts further to vary the type or character of particular recording mechanisms, each panel having provisions for support from the main chassis or frame.

Referring now more particularly to Fig. 1 of the drawings, a main supporting frame or chassis 10 has provisions to receive complemental frames for the formation of unitary structure comprising the essential operating mechanisms for a desired type of exhibiting instrument or recorder. Thus each one of the several different types of the recording element units and/or mechanisms illustrated on sheet 1 of the drawings is designed and arranged for direct mounting upon the main chassis 10 without interfering with each other, but for cooperation to perform their intended functions.

In case a simple curve drawing strip-chart instrument is desired, the unit recording element assembly of Fig. 1A is mounted directly upon the main chassis 10 by means of projecting legs 12 and 13 depending from unit frame 14, the lower ends thereof 12a and 13b being provided with openings registering with openings 10a and 10b provided in bosses 10d and 10e of the main chassis 10. The unit frame 14 is rigidly secured in place by bolts or by cap screws, the use of the latter of course requiring that the openings 10a and 10b be threaded to receive them. A marker or pen 15 and its carriage 15a is slidably mounted upon an elongated element, as the supporting shaft 16 carried by the unit frame 14, and may be of the type disclosed in the aforesaid copending application Serial No. 3,195.

For cooperation with the pen 15, the record chart assembly of Fig. 1D is secured to the main chassis 10. This assembly comprises a unit frame 18 carrying mandrels 19, 20 and 21 upon which the markable element, shown as a strip chart C, is wound.

By means of hinge elements 22 and 23 the frame 18 may be lowered over hinge pins 24 and 25 carried by the main chassis 10. Preferably the hinge pin 24, in the form of a sleeve fastened by a key 24k to the main chassis 10, is of the type described in the aforesaid copending application, Serial No. 714,756. Briefly, Fig. 6E, it consists of a worm 24a secured by pin 24c to a stub shaft 24b journaled within the sleeve 24 and driven by the skew gears 26a and 26b. As shown, the frame 18, while at a substantial angle to the main chassis, is lowered, its hinge elements 22 and 23 receiving the hinge pins 24 and 25, to a position such that the top of the chart C on mandrel 19 is substantially below the pen 15. Suitable mechanism, such as a cam 25a arranged to engage the top of pin 25, itself rigidly secured to the main chassis 10 as by pin 25b, is provided so that after frame 18 has been swung about the hinge pins 24 and 25 in a clockwise direction as viewed from above the instrument, to bring the chart C into a position parallel to the pen-supporting rod 16 of Fig. 1A, the chart may be elevated by rotation of arm 25c (Fig. 6c) and cam 25a to a position to be engaged by the marker or pen 15. In the fully assembled position, the worm 24a meshes with worm wheel 27 utilized to drive the strip chart, suitable driving means (not shown) being provided between the driving mandrel and the re-roll mandrel. The mandrel 20 supports the chart feed roll.

The pen 15 includes an ink reservoir to insure an ample supply of ink or marking fluid by means of which it draws distinctive curves upon the chart.

An important feature of the present invention, besides the permanent location on the main chassis 10 of a source of power, as a motor, for driving the strip chart as well as means for moving the marker across the chart in response to changes in the magnitude or character of the condition under measurement or control, is the fact the chassis and its actuating means or devices have provisions for supporting and operating separate unit assemblies which in selected complemental assembly provide any of a number of different types of instruments.

The operating and condition responsive devices common to all forms of the recorder instruments are preferably of the type described in U. S. Letters Patent 1,935,732, granted November 21, 1933, upon the application of L. Y. Squibb. In brief, this mechanism comprises a sensitive mechanical relay apparatus having a pair of clamping members or bars 28 (Fig. 3) between which a pointer 29 of a sensitive device, as a galvanometer G, is periodically free to deflect. One of the bars 28, for example the lower bar, is periodically moved toward engagement with the other, and with the pointer 29 by means of linkage elements (not shown) and a cam 30a continuously rotated by a power shaft 30 driven by a power means or motor M through suitable gearing 30b. There are also provided a pair of scissors-like pointer-engaging arms or feelers 31 pivoted respectively and intermediate their ends on a plate 32, shown in dotted outline in Fig. 3, and biased by a spring 31a into engagement with each other.

Figures 3, 3A:
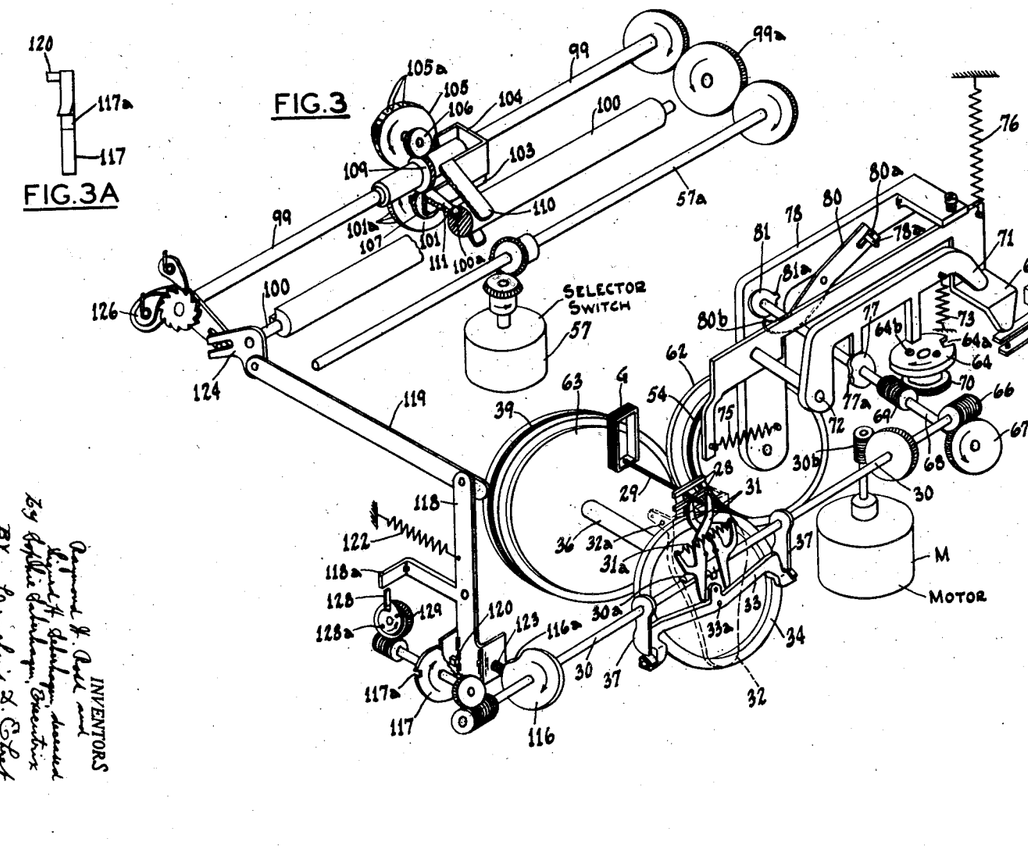
Fig. 3 is a perspective view, in part diagrammatic, of essential elements of the chassis of Fig. 1, the recalibrating unit of Fig. 1F, the operating mechanism of Fig. 1c and the multiple record printing mechanism of Fig. 1C.
Fig. 3A is a detail view of an operating cam shown in Fig. 3.

Also pivoted on the plate 32 is a clutch arm 33, the outer ends of which are provided with clutch surfaces or shoes (not shown) arranged to cooperate with a clutch disk 34.

The manner in which the sensitive mechanical relay operates to rotate the clutch disk 34 and its shaft 36 through an angle whose magnitude is dependent upon and constitutes a measure of the deflection of the pointer 29 is fully set forth in the above Squibb patent. It is sufficient here to say the galvanometer is connected to be responsive to a condition under measurement; that is to say, the pointer 29 is periodically free to deflect in response to unbalance of a circuit caused by variations in magnitude of the condition to be measured or controlled. After a period of freedom, the clamping bars 28 engage and retain the pointer 29 in a fixed position; the feelers 31, previously separated by the cam 30a, are then freed, the opposite ends moving toward each other. The pointer 29, acting as a stop for the upper end of one of them, permits the lower end of the other to engage a projection of the clutch arm 33 to move it about its pivot 33a through an angle depending upon the extent of deflection of the pointer from its central or neutral position. The pointer 29 is then released, the plate 32 pivoted at 32a, Fig. 3, moved to bring clutch arm 33 into engagement with the disk 34 and one of a pair of restoring cams 37 carried by the shaft 30 thereupon returns the clutch arm 33 to its horizontal and neutral position, rotating the clutch disk 34 and shaft 36, to which it is secured, amounts likewise depending upon the deflection of the pointer 29.

Also supported on and driven by the shaft 36 is a slidewire 39 which is preferably included in the galvanometer or condition responsive network for the purpose of rebalancing the measuring network or circuit to return the galvanometer pointer 29 to its normal position. If the circuit is not fully rebalanced, by a single adjustment, additional galvanometer deflections by the aforesaid cycle of operations adjusts the slidewire 39 until no deflection of the pointer 29 occurs, the network or circuit then being in balance. The shaft 36 also carries a pulley 40, shown in Figs. 1 and 6 but for clarity omitted in Fig. 3, which drives a cord or endless belt 41 passing over idler pulleys 42.

Provisions are made to secure the cord to the pen or marker-supporting carriage 15a. As shown (Figs. 1 and 1A), a plate 44 clamped to the belt 41 is provided with openings 44a through which extend pins 45 projecting from the marker carriage 15a to form a driving connection therebetween.

With the curve drawing instrument comprising the recording element assembly of Fig. 1A, the chart assembly of Fig. 1D, and the main chassis integrally secured together as aforesaid, it will be seen that the mechanical relay will displace the marker across the chart or the markable element C. From the position of the pen or marker 15 with respect to the chart, in conjunction with graduations on the chart which extend from edge to edge thereof, there may be read the magnitude of the condition under measurement or control. The marker or pen 15 places on the chart a record of the magnitude of the condition; as shown in Fig. 1, the chart driving gear 27 is driven through worm 24a, skew gears 26a and 26b, shaft 26 and gearing 26c from the shaft 30 and motor M. The speed of the chart by the aforesaid gearing is preferably reduced. By graduating the chart in the direction of its movement the magnitude of the condition as recorded on the chart by the marker for any given time, as minutes, hours, or days may be readily determined.

The galvanometer circuit or condition responsive network may be of the potentiometer or of the Wheatstone bridge type. For a circuit of the Wheatstone bridge type, a panel 48, Fig. 1K, is suitably secured in position behind the right-hand portion of the shaft 30 as viewed in Fig. 1, as by screws extending through openings 48a to the main chassis 10. The panel 48 carries a plurality of resistance elements 49 of suitable value to form the arms of the bridge, provisions being made for including in one bridge arm, a condition responsive device, as a resistor whose resistance varies with the condition under measurement or control.

When the recorder is used in a potentiometer-type measuring circuit a sub-panel 50, Fig. 1G, carrying resistors 51, a calibrating switch 52, and a standard cell S, is secured to the main chassis 10 in place of the panel 48. The potentiometer-circuit may be of the form shown in Fig. 2 wherein a suitable source of supply, as battery 53, is connected in series circuit relation with a calibrating slidewire 54, resistances 51, and the slidewire 39. The galvanometer G is connected in series with a thermocouple 56 whose voltage is normally balanced by adjustment of the slidewire 39. As will be explained more fully hereinafter, a selector switch 57 serves to connect in predetermined sequence additional responsive elements, only one, the element 56a, of which is shown. The calibrating switch 52, when operated from its left hand position to its right hand position, as viewed in Fig. 2, serves to connect the standard cell S directly in series with the galvanometer G. The voltage of the cell S as applied to the circuit is independent of the setting of the slidewire 39; if the voltage of the battery 53 has deviated from a predetermined value, the galvanometer deflects in direction and extent proportional to the deviation.

While the recalibration of the potentiometer circuit may sometimes be unnecessary, it is desirable periodically to determine the extent of change of the voltage of the battery 53 and automatically to adjust the calibrating resistance 54 in order to prevent errors in the galvanometer deflection, and to insure the deflection is dependent only upon variation in the condition under measurement or control. To this end a calibrating unit of the type shown and described in the aforesaid copending application Serial No. 75,208 is utilized and as embodied herein comprises a subsidiary frame 60, Fig. 1F, which supports the calibrating resistance 54 shown in the form of a slidewire, an arm 61 arranged to operate the calibrating switch 52, as well as the gearing and associated apparatus more clearly shown in the right hand portion of Fig. 3. The slidewire 54 and its operating disk 62 are supported on the same shaft as will more clearly appear hereinafter. An opening 60c of the frame 60 is adapted to slide over a boss 10f projecting from the main chassis 10, a set screw 60f being provided additionally to lock the frame 60 into a fixed position. Due to the disk 62 and slidewire 54 it is necessary to turn the frame 60 in a clockwise direction about the axis of the boss 10f until the disk is free of the main chassis. The frame 60 is then moved axially of the boss until the disk 62 registers with opening 10h and by rotating the frame 60 in a counter-clockwise direction the disk 62 is moved through opening 10k and into alignment with a driving disk 63 omitted in Fig. 1 for the sake of clarity but shown in Fig. 3. The frame 60 is clamped into a fixed position by means of the set screw 60f.

With the recalibrating unit of Fig. 1F assembled on the main chassis 10, reference may be had to Fig. 3 in connection with the following description of its operation. Assuming that recalibration is desired every forty-eight minutes, a double-reduction worm gear drive is interposed between a disk 64 and the shaft 30 which rotates at substantially constant speed; the gear drive has a ratio such that the disk 64 completes one revolution every forty-eight minutes. The reduction gear drive comprises a worm 66 secured to shaft 30 and meshing with a worm wheel 67 upon whose shaft 68 a worm 69 meshes with a worm wheel 70 arranged to drive the disk 64. By means of a notch 64a in the periphery of the disk 64, an arm 71, pivoted at 72, is released for clockwise movement under the influence of a biasing spring 73, the outer or free end of arm 71 engaging and moving downwardly a second arm 61 against the bias of springs 75 and 76 to operate the switch 52 to effect a change in the circuit connections corresponding to the movement of the switch 52 from its left to its right hand position as viewed in Fig. 2.

While the disk 64 predetermines the frequency of recalibration, an additional cam 77 secured to shaft 68 has a recess 77a whose size predetermines the number of cycles of operation of the relay for recalibration. Eight cycles for recalibration is ordinarily sufficient.

The slidewire 54 and clutch disk 62 are pivotally carried from a depending end of an arm 78 journaled on shaft 68. Therefore, upon occurrence of the aforesaid clockwise movement of the arm 71, the arm 78 by reason of the resilient connection formed by the spring 75, is rotated in a clockwise direction to effect driving engagement between the clutch disk 62 and the cooperating disk 63 driven by the shaft 36.

Figures 2, 4, 4A, 5:
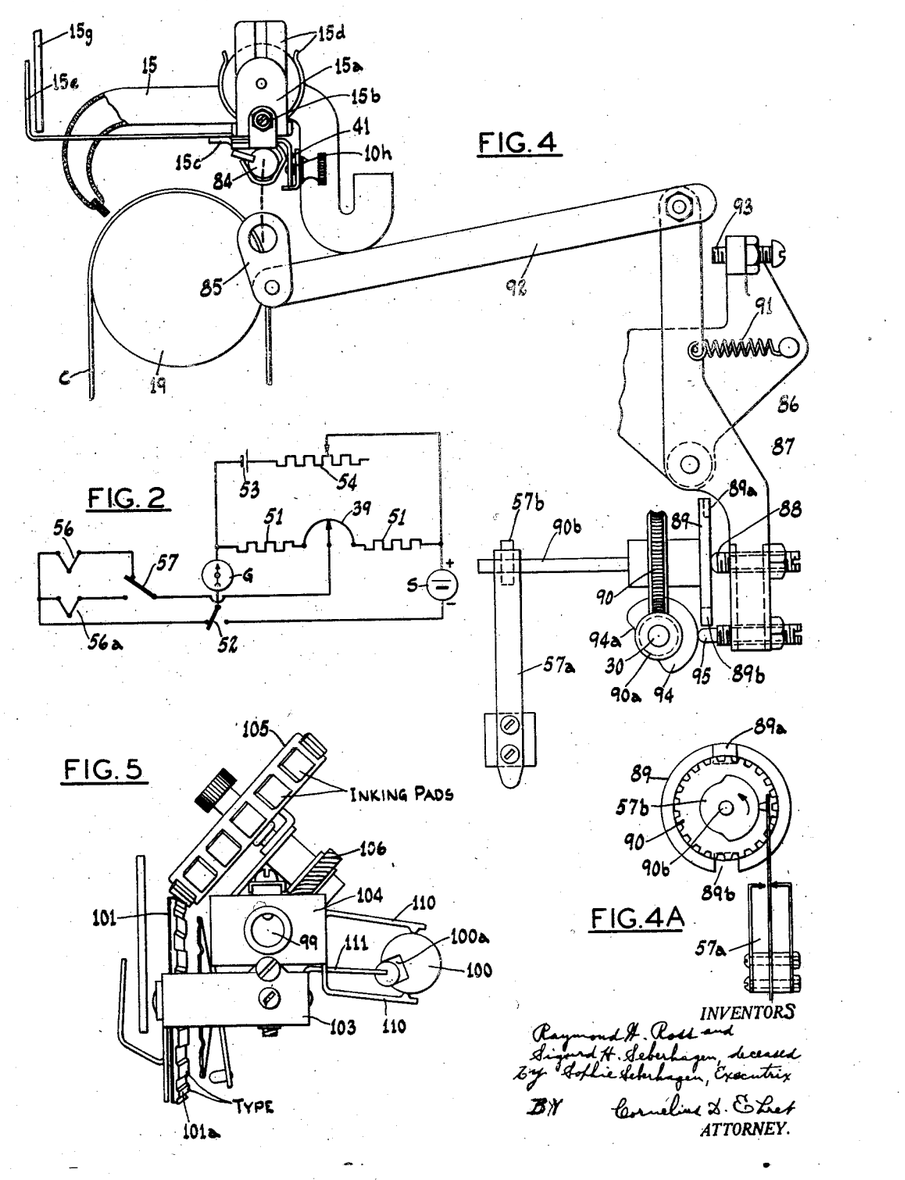
Fig. 2 is a schematic diagram of one form of measuring network or circuit.
Fig. 4 is a schematic representation of essential elements of the operating mechanism of Fig. 1b and of the dot-and-dash recorder of Fig. 1B.
Fig. 4A is a detail view, in part diagrammatic, illustrating a selector switch and associated operating mechanism.
Fig. 5 is an end elevation of the print wheel, inking drum, their supports and connecting gearing of Fig. 1C.

If the voltage of the battery 53, Fig. 2, has deviated from its predetermined value the pointer 29, after release by the bars 28, deflects a predetermined amount to shift the clutch arm 33 in a corresponding direction and by a corresponding or amplified amount. One or the other of restoring cams 37 thereafter returns the clutch arm 33 to its normal or horizontal position, the arm 33 because of its aforesaid engagement with the clutch disk 34 rotating the latter and its shaft 36 in a corresponding direction and by a corresponding amount. By reason of the driving engagement of disks 62 and 63, the slidewire 54 is by the mechanical relay adjusted in the proper direction to reestablish the correct voltage from battery 53 as applied to the potentiometer measuring circuit. Only a few cycles of operation of the mechanical relay is necessary to complete recalibration. As soon as these cycles, for example, eight of them, have been completed the cam 77 lifts the arm 71, the springs 75 and 76 then returning the arms 61 and 78 to the positions shown in Fig. 3.

Since, during recalibration, the extent of movement of the calibrating slidewire 54 is generally very small, it is desirable to prevent the driving engagement between disks 62 and 63 while the clutch arm 33 is in a deflected position. To this end an additional arm 80 may be pivotally mounted on subsidiary frame 60 (Fig. 1F), one slotted end 80a (Fig. 3) of which engages a pin 78a carried by the arm 78 and the opposite end 80b of which is arranged to cooperate with a pointed projection 81a of a cam 81 secured to the shaft 68, the position of the pointed end 81a being phased with respect to shaft 30 and cam 30a to prevent engagement of disks 62 and 63 while the clutch arm 33 is in a deflected position. The spring 75 permits independent movement of the arms 61 and 71 for immediate operation of the switch 52. As soon as the clutch arm 33 is returned to its neutral position by one or the other of the restoring cams 37, the cam 81 will have been rotated an amount sufficient to release the arm 78 to effect the aforesaid driving engagement between disks 62 and 63.

In the foregoing strip-chart curve drawing instrument the marker remains in contact with the chart during recalibration. For many purposes this is not disadvantageous.

Instead of the potentiometer-circuit panel 50, Fig. 1G, the panel 82 of Fig. 1H may be secured to the main chassis, this panel supporting device 82a arranged to unbalance the measuring network in response to change in frequency of a source of current and thereby cause deflection of the galvanometer pointer.

If desired, additional control devices may be supported on the panel, such, for example, as a switch 82b and a rheostat 82c.

The interchangeability of the several mechanisms illustrated on Sheet 1 of the drawings to change the character of the instrument constitutes an important feature of the present invention. For example, when it is desired to convert the curve-drawing instrument into one for indicating, recording or measuring two distinct conditions at the same or different locations, the complemental or subsidiary frame 14 is replaced by a frame 83, Fig. 1B, having depending projections 83a and 83b identical with the depending projections 12a and 13b both as to shape and function. In this instance the pen or marker 15 is not only slidable upon a rod or an elongated element shown as shaft 84 but its carriage 15a is also keyed or otherwise secured to it for rotation therewith. Upon clockwise movement of an arm 85, as viewed in Fig. 1B, the shaft 84 lifts the pen 15 from the record chart. Preferably the pen or marker-assembly is of the type shown and described in aforesaid copending application Serial No. 3,195. Briefly, it consists of the carriage 15a pivoted by pins 15b to a bracket 15c slidably mounted on splined shaft 84. The marker itself, including its container, is resiliently held in a clip 15d. An extension 15e may be provided, an upturned end of which forms a pointer for a scale 15g calibrated in similar manner to the chart C. In lieu of the pins 45, Figs. 1A and 1B, a clamp 10h is arranged to maintain a driving connection between the marker assembly and the driving cord or belt 41.

In order to oscillate the marker 15 into and out of engagement with the chart C there is provided the unit operating mechanism of Fig. 1b which comprises a frame 86 secured to chassis 10 by screws passing through openings 86a. On the frame 86 there is pivotally supported at 87a an operating arm 87. Supported in one end of arm 87, Fig. 4, is an adjustable pin 88 registering with the outer periphery of a disk 89 driven by a worm gear 90 and a worm 90a secured to the drive shaft 30. The disk 89 is provided with two recesses 89a and 89b diametrically opposite each other; the recess 89b is substantially deeper than recess 89a and as shown may be a peripheral notch. A biasing spring 91, connected to the arm 87, is, through link 92 and the crank arm 85, itself secured to shaft 84, effective to bias for movement toward the record chart the shaft 84 and with it the marker 15. An adjustable stop 93 may be provided to limit the throw of the arm 87 under influence of the biasing spring 91. This unit mechanism is preferably of the type described in the aforesaid copending application, Serial No. 3,195.

Preferably the ratio of gears 90 and 90a is such that one or the other of recesses 89a and 89b registers with the pin 88, upon completion of a predetermined number of revolutions, such as twenty-four, of the shaft 30; each revolution of the shaft corresponding to one operating cycle of the mechanical relay.

With the subsidiary frames 83 and 86, Figs. 1B and 1b, secured to the main chassis 10 as described above, it will be assumed the mechanical relay has completed its predetermined number of cycles, such as twenty-four. The marker 15 occupies a position with respect to the chart C corresponding to the magnitude of the condition. As the twenty-fourth cycle is completed the pin 88 registers with notch 89a. As soon as notch 94a of cam 94 driven by shaft 30 registers with pin 95 carried by arm 87, the marker 15 is quickly lowered into engagement with the chart. By means of the set screw 94b the cam 94 may be adjusted so that the aforesaid registration takes place while the clutch arm 33 is horizontal. The extent of movement of the marker is limited by the depth of recess 89a and, in this instance, is just sufficient for the pen to engage the chart to leave imprinted thereon a dot. Since the marking of the dot occurs while the clutch arm 33 is horizontal, smearing and irregular records are eliminated. The marker 15, by continued rotation of cam 94, is immediately lifted from the record chart.

The selector switch 57a (Figs. 4 and 4A) is then moved, as by cam 57b driven by shaft 90b, to a second position to connect the galvanometer G in circuit with a second condition responsive device, as for example the device 56a of Fig. 2. After the relay has again completed its twenty-four cycles of operation and has moved the marker 15 to correspond with the magnitude of the second condition under measurement or control, the notch 89b is then moved into registration with the pin 88. In this case the marker 15, after registration of notch 94a and pin 95, is not only moved into engagement with the chart, but by reason of the greater depth of the notch or recess 89b, the marker 15 after engagement of the chart slides along the chart and marks thereon a dash. The additional movement which results in the dash is provided for by the pivotal interconnection of the carriage 15a and the bracket 15c. As the aforesaid cycles are repeated, the two distinctive records periodically register on the chart the respective magnitudes of the conditions under measurement or control.

As previously explained, in accordance with the present invention the main chassis 10 is utilized for a wide variety of types of instruments and it will be seen that the character of the recording instrument or mechanism may be widely varied by simply using selected devices, of which, in accordance with the present invention, a wide variety are available. For example, the calibrating device (Fig. 1F) is preferably included for potentiometer operated recorders while for other types it may or may not be omitted. Each instrument, in accordance with the present invention, is characterized by the provisions for mounting the marker-assemblies of Figs. 1A, 1B and 1C on the upper surface of the chassis 10, with their respective markers supported in cooperative relation with a markable element supported from an adjacent side of the main chassis. Further in accordance with the invention, the unit operating mechanisms are supported on the ends of the chassis 10 with the shaft 30 interconnecting them and each having component parts arranged for cooperation with other parts of component assemblies of the instrument. The arrangement, method and structural features of the present invention decrease the cost of the recorder and provide great flexibility in the possible use which may be made of the instrument.

In case the instrument is to be used to measure or control a large number of conditions, a multiple point printing assembly (Fig. 1C) comprising a main frame 98 having depending projections 98a and 98b, may be secured to the main chassis 10 in the manner described in connection with Figs. 1A and 1B. Journaled in the frame 98 are a pair of guide shafts 99, 100. The print wheel 101, having distinctive characters 101a (Figs. 3 and 5) spaced about its periphery, is journaled in a frame 103 pivotally secured to a carriage 104 within which is journaled an inking disk 105, the inking disk and print wheel having secured to their respective stub shafts, gears 106 and 107 (Figs. 3 and 4) arranged in meshing engagement with a gear 109 journaled in the carriage 104 and keyed to the shaft 99. From the carriage 104 extend arms 110 which engage opposite sides of the shaft 100 to prevent rotation of the carriage; the frame 103 is provided with an extension 111, one end of which nests within a longitudinal slot 100a provided in the shaft 100.

In order to operate the aforesaid printing mechanism, a unit operating mechanism, Fig. 1c, having a subsidiary frame 115 is secured to the main chassis 10. The details of the mechanism carried by the frame 115 are clearly shown in the lower left hand portion of Fig. 3 as well as the phase relation of cam 116, disk 117, and the manner in which operating arms 118 and 119 are fastened together after both the subsidiary frame of 115 and the multiple point printing assembly of Fig. 1C have been secured to the main chassis 10.

With the recorder mechanism, or instrument, as thus constructed, and with the selector switch 57 supported from the frame 98 and driven by a third shaft 57a geared to shafts 99 through idler gear 99a, the mechanical relay, positions or drives by means of the endless belt 41, the carriage 104, carrying the frame 103, with respect to the chart. After a predetermined number of revolutions of shaft 30, for example twenty-four, the disk 117 is moved until its notch 117a registers with a projection 120 of arm 118. The arm 118, moving under the influence of a biasing spring 122 as soon as the recess 116a of cam 116 registers with a projection 123, rotates by means of the link 119 a crank arm 124 and the shaft 100 in a clockwise direction. By means of the extension 111 the frame 103 is rotated about its pivotal axis until the print wheel 101 prints a distinctive character upon the chart. This printing movement is relatively rapid, the print wheel being immediately returned by rotation of the cam 116 driven by shaft 30. The return movement of the print wheel and the crank arm 124 causes the ratchet pawl 126 to rotate the shaft 99 and the gears 109 and 107 an amount sufficient to move the print wheel 101 to bring another of its reference characters into printing position. At the same time the gear 106 drives the inking disk 105 an amount sufficient to bring the next inking pad into registration with the next character.

By means of a raised portion (Fig. 3A) preferably adjacent the notch 117a of the disk 117, a slight counterclockwise movement, just prior to each printing operation, is imparted to the print wheel 101 to move it firmly into engagement with a corresponding one of the inking pads 185a carried by the inking disk 105, thereby inking another one of the printing characters for subsequent printing operation.

During the aforesaid rotation of the elongated element or shaft 99, the selector switch 57 is moved to a new position to connect a succeeding one, Fig. 2, of the various condition responsive elements 56, 56a, etc. into the potentiometer network or circuit.

While the recalibrating unit, Fig. 1F, may be omitted from the last described recording mechanism, it is desirable to include such a unit. As described in the aforesaid copending application Serial No. 75,208, the recalibrating period is preferably independent of the position of the selector switch 57. To prevent printing operations during recalibration, a projection 128 supported from worm wheel 129 is arranged for movement beneath a projection 118a of arm 118.

The position of the projection 128 is phased with respect to the disk 64 of the recalibrating unit so that the projection 128 moves beneath the projection 118a of the arm 118 after the projection of arm 71 registers with the recess 64a of disk 64 and before the recess 77a of cam 77 registers with its associated projection.

Proper phasing is readily obtained. For example, after the unit mechanism (Fig. 1F) by set screw 60f has been locked in position, the mechanical relay is operated until the notch 64a of the disk 64 registers with its cooperating projection of arm 71, and until the recess 77a of cam 77 registers with its projection. In other words, the calibrating mechanism is first operated to initiate recalibration. The motor M is then deenergized.

In case the notch 77a and 64a do not simultaneously register with their respective projections, the disk 64 is loosened from its driving hub by unscrewing the screws 64b and adjusted until the arm 71 freely moves to its lower position. The screws 64b are tightened and adjustment then made of the unit operating mechanism of Fig. 1c.

Since the cam 116, Fig. 3, is secured directly to the shaft, it is loosely carried in a compartment of the frame 115, Fig. 1c. Means are provided for keying the cam 116 to the shaft with its depression 116a registering with the pin or follower 123 while the clutch arm 33 is in a horizontal position. If necessary the disk 117 may be adjusted until notch 117a and 116a simultaneously register with their respective projections 120 and 123, by loosening a set screw (not shown) which secures the disk to its shaft, or adjusting means identical with that of disk 64 may be provided.

The parts are now in position for printing a record on the chart and for initiation of recalibrating operations. To prevent printing and movement of the selector switch 57 the arm 118 is manually moved in a clockwise direction as viewed in Fig. 3, and the projection 128 rotated on the hub of gear 129 until it is beneath the arm or projection 118a. The screws 128a are then tightened to lock the projection to the gear 129. The proper phase relation is thereafter maintained and printing cannot occur during recalibration. The printing operation is delayed until after recalibration.

The calibrating cycle need not be described again since the operations are identical with those described in connection with the strip-chart curve drawing instrument comprising mechanisms of Figs. 1, 1A and 1F.

After calibration has been completed, as described above, the projection 128, prior to the time for printing, is moved to again free the arm 118 for movement in accordance with the positions of the disk 117 and the cam 116.

In accordance with the present invention an instrument of the round-chart type is readily provided by substituting the unit assembly of Fig. 1E for the assembly of Fig. 1D. The former comprises a frame 130 provided with hinge elements 131 and 132 arranged to receive the hinge pins 24 and 25; the worm 24a of the main chassis 10 meshes with the worm gear 133 which, through additional gearing 134 drives the chart 135, Fig. 6D.

After the frame 130 is lowered into place, it is swung in a clockwise direction, as viewed from the top of the instrument, until a projection 136, Fig. 1E, secured to a pulley 137 nests within a notch 138a of a disk 138 rigidly secured to the relay shaft 36. (In Fig. 1E the pulley 137 is shown below the gearing 134 for the sake of clearness. In practice it is preferably journaled on a stub shaft carried by the lower gear of gearing 134.) This driving connection takes the place of the endless belt or cord 41. Thus, in response to variation in the magnitude of the condition, the movement of the shaft 36 is transmitted to the pulley 137 upon which is supported an endless belt 138; the belt passes over idler pulleys 139 towards the front of the instrument and is there supported on additional idler pulleys (not shown) carried by an arm 140, Fig. 6D, pivoted at 141, the outermost portion of the belt 138 being threaded over a pulley supported from the arm 140 coaxially with the chart. Upon this pulley is mounted an index or pointer 142 which serves to indicate at all times the magnitude of the condition under measurement or control. Slidably mounted on the arm 140 is a marker 143 driven radially of the chart by the cord or belt 138. The combination of the index and marker, per se, forms no part of the present invention; it is fully described in copending applications Serial Nos. 692,803 and 740,260 respectively filed on October 9, 1933 and on August 17, 1934, both assigned to the same assignee as the present invention.

In accordance with a further feature of the present invention, any one of the various exhibiting instruments which may be formed by complemental assembly of subsidiary units on the main chassis 10 is arranged for mounting in a housing or casing. The over-all dimensions of each of the various exhibiting instruments is approximately the same so that a housing of a single size is suitable for all of the various types of instruments.

Figures 6, 6A, 6B, 6C, 6D, 6E:
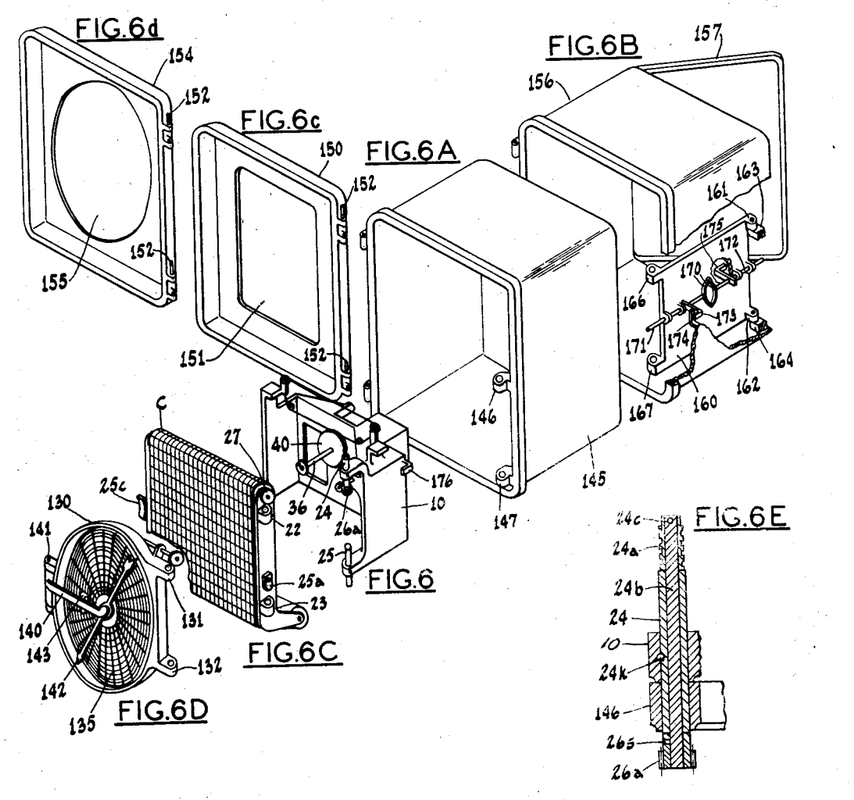
Fig. 6 is a perspective view of the main chassis of Fig. 1 as seen from the front of the instrument prior to mounting in the case.
Fig. 6A is a perspective view of an enclosing housing or case.
Fig. 6B is a perspective view of an alternative form of housing with its rear door open, the front door omitted, and one wall broken away to show a part of a double-hinge arrangement and its associated interlocking means.
Fig. 6C is a perspective view of the strip-chart mechanism of Fig. 1D as seen from the front of the instrument prior to assembly on the main chassis of Fig. 6.
Fig. 6D is a perspective view of the round-chart drive of Fig. 1E as viewed from the front of the instrument and prior to assembly on the main chassis of Fig. 6.
Fig. 6E is a fractional cross-sectional view of the hinge pin 24 and its associated parts.

Referring now to Figs. 6 and 6A, a housing 145 is provided with hinge elements 146 and 147 arranged to receive the hinge pins 24 and 25 of the main frame or chassis 10. Before supporting the main chassis 10 from the housing 145, however, the gears 26a and 26b are removed from their respective shafts, suitable set screws being provided for this purpose. The set screw 26s of the gear 26a is shown in Fig. 6E. The main chassis 10 may now be lowered into place, the lower portions of the hinge pins 24 and 25 being freely slidable through the openings in the hinge elements 146 and 147. The gears 26a and 26b are then replaced on their respective shafts 24b and 26 and the set screws tightened.

Either the strip chart assembly of Fig. 6C or the round chart assembly of Fig. 6D may be mounted on the main chassis 10 in the manner described above. In the same way a selected one of the subsidiary frames of Figs. 1A, 1B, 1C is secured to the main chassis, as well as selected subsidiary operating mechanisms and panels. When the desired type of instrument has been assembled as above described, the instrument as a whole is swung inwardly into the housing 145. For the strip chart assembly a door 150 with a rectangular glass window 151 is by hinge pins 152 secured to the housing 145. For the round chart instrument a door 154 with a round glass window 155 is used.

The housing itself may be supported from a panel, framework, or supporting structure in the usual conventional manner. In case the front of the housing is arranged with respect to other apparatus, or its supporting structure, in a manner such that the main chassis 10 and its associated complemental units or assemblies may not be readily swung out of the housing, the double-hinge arrangement and housing 156 of Fig. 6B may be used, which provides for the pivotal movement of the recorder mechanism either through a front or rear opening thereof. In addition to provisions for the front door, which may be either of the type shown in Figs. 6c and 6d, additional provisions on the housing 156 are made for a rear door 157 hinged for movement between open and closed positions.

The double-hinge arrangement comprises an auxiliary hinge plate 160 having hinge elements 161 and 162 which rest respectively upon hinge elements 163 and 164 formed integrally with the housing 156, suitable hinge pins being provided to maintain the elements in alignment. An additional pair of hinge elements 166 and 167, located at the opposite end of the plate 160, is arranged to receive the hinge pins 24 and 25 of the main chassis 10, these elements 166 and 167 having the identical function as the hinge elements 146 and 147 of the casing 145 of Fig. 6A.

As shown in Fig. 6B the rear door 157 is in the open position and the front door omitted. In consequence, a pair of leaf springs 170 is effective to move rods 171 and 172 respectively toward the front and rear of the housing 156. A latch 173 secured to the rod 171 is thereby retained behind a cooperating latch 174 carried by the housing 156. Similarly, a latching member 175 carried by the rod 172 and projecting through an opening provided in the plate 160 is moved behind a cooperating latching member 176 carried by the main chassis 10. Therefore, with both front and rear doors in the open position the main chassis 10 is locked in position and no pivotal movement can occur.

If the rear door 157 is closed it engages the end of the rod 172 and moves it against the bias of the springs 170 to disengage the latching member 175 from its cooperating member 176. The chassis 10 may now be swung outwardly through the front of the housing for inspection of parts or for change in the character of the unit assemblies, or for replacement of parts.

Assuming now that the main chassis 10 is within the housing 156 and that the front door is moved to the closed position, it will be seen that the rod 171 is moved against the bias of the springs 170 to disengage latch members 173 and 174. The chassis 10 may now be swung about its right-hand pivotal axis, the plate 160 moving with the chassis. In this manner pivotal movement of the chassis is selectively controlled by the front and rear doors and unless the rods 171 and 172 are manually operated either the front or the rear door must be closed before the main chassis 10 can be swung from the housing.

While there has been described what at present are considered the preferred embodiments of the invention, it will be obvious to those skilled in the art that various changes and modifications may be made without departing from the invention and therefore the appended claims cover all such changes and modifications as fall within the spirit and scope of the invention.

What is claimed is:

1. An exhibiting instrument comprising a main chassis upon which there are supported a motor, a primary condition responsive device, a mechanical relay controlled by said primary device for actuating a driving member, and an operating shaft driven by said motor for operating said relay and extending across one side of said chassis, provisions on one end of said chassis for supporting a recalibrating unit with a driving element thereof driven by said shaft, provisions for supporting on the opposite end of said chassis a marker-actuating means with a driving element thereof driven by said shaft, and provisions on said main chassis for supporting exhibiting structure including at least one movable member, said shaft mechanically interconnecting said marker-actuating means and said recalibrating unit.

2. In a recorder, a plurality of complemental unit assemblies, a main chassis upon which are permanently mounted respectively a driving motor, a primary condition responsive device, a mechanical relay device, a secondary member movable by said motor under the control of said primary device and said relay device, and a marker-driving means connected to said secondary member, one of said unit assemblies comprising a marker and supporting frame, means mounting said marker on said frame for independent traverse and rotational movement, provisions on said chassis and said frame for supporting said marker in operative relation to said marker-driving means for transverse movement, a second unit assembly comprising chart-supporting mandrels and a second frame therefor, a driven member for rotating at least one of said mandrels, provisions on said chassis and said second frame for mounting said second frame on said chassis, a driving member journaled in said chassis for engagement with said driven member, a third unit assembly comprising an actuating member, driving means for imparting predetermined movement to said actuating member, provisions on said chassis for supporting said third unit assembly therefrom, means connecting said driving means in predetermined phase relation to said relay device, and means operable by said actuating member to move said marker into and out of engagement with the chart.

3. In a recorder, the combination of a plurality of complemental unit assemblies, one assembly comprising a chassis upon which are mounted a rotatable element and means operable in accord with changes in the magnitude of a condition for effecting rotation of said element, a second of said unit assemblies comprising a frame upon which are mounted a marker and an elongated element slidably supporting said marker, a third of said unit assemblies comprising a second frame upon which are mounted rotatable means for supporting a markable element and driving means therefor, provisions on said complemental unit assemblies for positioning said first and second-named frames with said marker disposed in operative relation to said markable element, means operable by said rotatable element when said first-named frame is in said operative relation for displacing said marker across said markable element, and means operable when said second-named frame is in said operative relation for driving said rotatable means and said markable element at a predetermined speed with respect to said marker.

4. In a recorder, the combination of a plurality of complemental unit assemblies, one assembly comprising a chassis upon which are mounted a rotatable element and means operable in accord with changes in the magnitude of a condition for effecting rotation of said element, a second of said unit assemblies comprising a frame upon which are mounted a marker and an elongated element slidably supporting said marker, a third of said unit assemblies comprising a second frame upon which are mounted rotatable means for supporting a markable element and driving means therefor, provisions on said complemental unit assemblies for positioning said first and second-named frames with said marker disposed continuously to produce a mark upon said markable element, means operable by said rotatable element when said first-named frame is in said operative relation for displacing said marker across said markable element, and means operable when said second-named frame is in said operative relation for driving said rotatable means and said markable element at a predetermined speed with respect to said marker.

5. In a recorder, the combination of a plurality of complemental unit assemblies, one assembly comprising a chassis upon which are mounted a rotatable element and means operable in accord with changes in the magnitude of a condition for effecting rotation of said element, a second of said unit assemblies comprising a frame upon which are mounted a marker and an elongated element determining the path of movement of said marker, a third of said unit assemblies comprising a second frame upon which are mounted rotatable means for supporting a markable element and driving means therefor, provisions on said complemental unit assemblies for positioning said first and second-named frames with said marker disposed in operative relation to said markable element, means operable by said rotatable element when said first-named frame is in said operative relation for displacing said marker across said markable element, means operable when said second-named frame is in said cooperative relation for driving said rotatable means and said markable element at a predetermined speed with respect to said marker, a fourth of said complemental unit assemblies comprising a third frame upon which are mounted calibrating means, provisions on said third frame and one of said other complemental unit assemblies for positioning said third frame in operative relation to said rotatable element, and means intermittently operable for effecting a driving connection between said rotatable element and said calibrating means.

6. In a recorder, the combination of a plurality of complemental unit assemblies, one assembly comprising a chassis upon which are mounted a rotatable element and means operable in accord with changes in the magnitude of a condition for effecting rotation of said element, a second of said unit assemblies comprising a first frame upon which are mounted a marker and means including an elongated element slidably supporting said marker and providing for pivotal movement of said marker, a third of said unit assemblies comprising a second frame upon which are mounted rotatable means for supporting a markable element and driving means therefor, provisions on said complemental unit assemblies for supporting said first and second frames with said marker disposed in operative relation with said markable element, means driven by said rotatable element for displacing said marker across said markable element when said first frame is in its supported position, means operable when said second frame is in its supported position for driving said rotatable means at predetermined speed with respect to said marker, a fourth of said unit assemblies comprising a third frame upon which are mounted a marker-actuating member and control means for predetermining the movement of said actuating member, provisions on said complemental unit assemblies for supporting said last-named unit assembly with said actuating member operatively associated with said marker assembly to control said pivotal movement to move said marker into and out of operative position with respect to said markable element, and means carried by said chassis for actuating said control means at a speed bearing a predetermined relation to said speed of said markable element.

7. In a recorder, the combination of a plurality of complemental unit assemblies, a main chassis upon which are mounted a continuously rotating shaft, a motor for driving said shaft, a primary condition responsive device, a mechanical relay and a secondary member movable by said motor under the control of said primary device and said relay, one of said unit assemblies comprising a frame upon which are mounted an elongated supporting member, a print wheel slidably supported by said member and bodily movable into and out of a printing position, and means controlling the printing movement of said print wheel, a second of said unit assemblies comprising a frame upon which are mounted rotatable elements for supporting a chart and driving means for said chart, a third of said unit assemblies comprising a frame upon which are mounted an actuating member for effecting at predetermined times a printing operation of said print wheel and operating means for said member, provisions on said main chassis for supporting said first and second-named frames in relation such that said print wheel is disposed for printing engagement with said chart, means operable by said secondary member when said first-named frame is in its supported position for displacing said print wheel across said chart, means operable when said second-named frame is in its supported position for connecting said chart-driving means to said continuously rotating shaft, provisions on said chassis for supporting said third-named frame with its said actuating member in cooperative relation with said print-wheel control means, means for connecting said actuating member of said third unit assembly to said print-wheel control means, and means connecting said operating means of said third unit assembly to said shaft to establish operation in timed relation with said relay.

8. In a recorder, the combination of a main chassis upon which are mounted a drive shaft extending between opposite ends of the chassis and a second drive shaft extending to a side portion thereof, a driving motor for said shafts and a mechanical relay including a galvanometer and a secondary member movable by said motor under the control of said galvanometer, a plurality of complemental unit assemblies each having its own supporting frame and respectively comprising chart-supporting and actuating means, recalibrating means, and control means for the marker, provisions on said main chassis for supporting said recalibrating and marker-control assemblies at said opposite ends of said chassis, means for connecting said first-named shaft to said last-named assemblies to establish a fixed phase relation between them and said relay, provisions on said main chassis for supporting said chart assembly adjacent said side portion of said main chassis with its chart-actuating means in driving engagement with said other shaft, provisions on said main chassis for supporting said marker assembly from another side portion of said chassis with its marker in cooperative relation with said chart, and means effective when said marker assembly is in said supported position for establishing a driving connection between said marker and said secondary member for displacement of said marker across said chart.

RAYMOND W. ROSS.
SOPHIE SEBERHAGEN,
*Executrix of the Last Will and Testament of Sigurd H. Seberhagen, Deceased.*